April 27, 1954 — I. NESSON — 2,676,351
CONNECTOR FOR WINDSHIELD WIPER ARMS
Filed March 28, 1950 — 2 Sheets-Sheet 1

Inventor:
Isreal Nesson,
by Thomson & Thomson
Attorneys

April 27, 1954

I. NESSON 2,676,351

CONNECTOR FOR WINDSHIELD WIPER ARMS

Filed March 28, 1950

Inventor:
Isreal Nesson,
by Thomson & Thomson
Attorneys

Patented Apr. 27, 1954

2,676,351

UNITED STATES PATENT OFFICE 2,676,351

CONNECTOR FOR WINDSHIELD WIPER ARMS

Israel Nesson, Lynn, Mass., assignor to Max Zaiger, Swampscott, Mass.

Application March 28, 1950, Serial No. 152,401

4 Claims. (Cl. 15—250)

This invention relates to windshield wipers, and pertains more particularly to improvements in the connector elements employed for separably attaching a wiper blade to the free end of an operating wiper arm designed for use with a clip element of the connector.

The principal purpose of the invention is to provide the wiper arm and wiper blade with releasably interlocking connector elements so constructed and arranged as to provide a true pivotal bearing between the connected members, which are securely held in pivotal engagement under spring pressure, preferably exerted in the direction toward which the arm end is conventionally tensioned by the wiper arm, until the members are manually separated.

Another object of the invention is to substantially eliminate the noisy chattering heretofore characteristic of most arm-blade connections during operative movement of the arm, by restraining all relative movement between the interconnected elements of the improved connector, except the desired angular or pivotal movement of the arm in the arm-blade plane, which is slight and silent in normal operation. The spring-pressed interlocking, pivotal connection above mentioned restrains relative longitudinal, or directly transverse movement between the arm end and the blade clip; tilting of the arm end in the clip is restrained by the special, laterally offset formation of the arm end and the engagement of its side edges with the sides of the clip, as hereinafter explained; and angular movement of the arm transversely of the blade is further avoided by the deflected tail-piece construction hereafter described in connection with a modified form of the connector elements.

A further purpose of this invention is to provide connector elements which are relatively simple and economical to manufacture, durable in use, easily connected together and interlocked by pressing the arm end into the blade clip, and readily separated by manually pressing the arm end transversely of the clip, in a direction away from the blade, to release the spring-pressed pivotal engagement, and then retracting the arm from the clip. The improved connector thus affords a readily separable but secure, interlocking, pivotal connection without the necessity of providing a separate, manually releasable latch element. The spring associated with one of the interconnected elements constitutes the only latching or locking element of the improved device and the spring pressure acts to hold the arm end on a pivot element of the clip in such a way that any wear on the pivotal bearing is compensated by the action of the spring, thereby avoiding looseness and chattering at the pivot even after long use of the improved windshield wiper.

These objects are attained by providing a windshield wiper in which the connector means preferably comprise a clip mounted on the wiper blade and having a shaft-like bearing element fixed transversely between parallel sides of the clip; a wiper arm having a laterally offset end formed to provide a socket-like bearing element pivotally engageable with the bearing element of the clip; and a leaf spring associated with one of the bearing elements and pressing against the other bearing element when the parts are connected, releasably to secure the parts in pivotal engagement.

Other features of the improved connector will be described in connection with the recommended embodiments of the invention shown in the accompanying drawings, and will be pointed out in the appended claims. It will be understood, however, that the structural details of the devices herein illustrated and described may be varied to suit particular purposes without departing from the essence of the invention as set forth in said claims.

Figure 1:
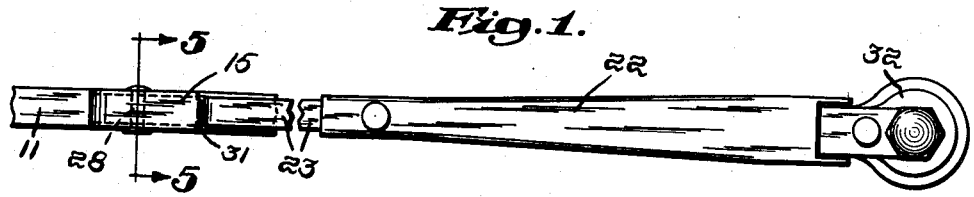
Fig. 1 is a plan view, partly broken away, of a windshield wiper arm and blade interconnected by the improved connector means.
Figure 2:
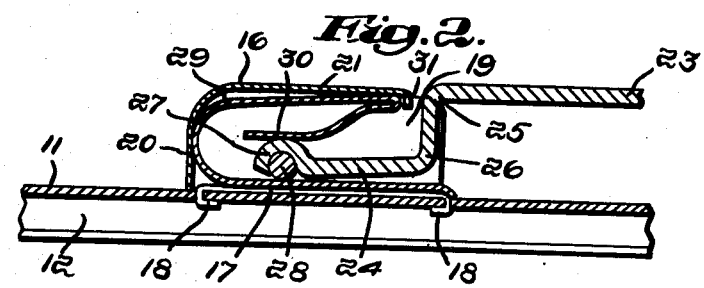
Fig. 2 is an enlarged fragmentary section of the improved connector means, showing the operative position of the interconnected elements, the rubber wiper strip of the blade being omitted.
Figure 3:
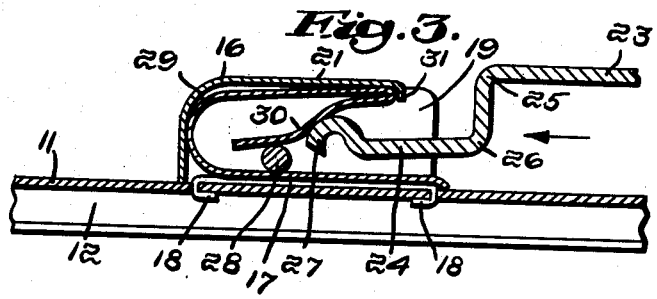
Fig. 3 is a view similar to Fig. 2 showing the relation of the connector parts while the end of the arm is being manually pressed into interlocking position with the clip on the blade holder.
Figure 4:
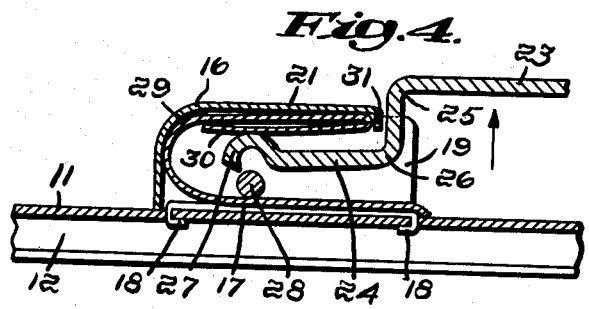
Fig. 4 is a view similar to Fig. 2 indicating the relationship of the connector parts while the arm end is manually pressed upwardly to release the pivotal connection therebetween.
Figure 5:
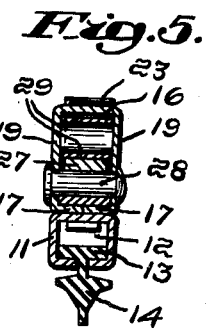
Fig. 5 is an enlarged transverse section on line 5—5 of Fig. 1, certain parts beyond the plane of section being omitted.

In the form chosen for the purpose of illustration in Figs. 1 to 5 inclusive, the windshield wiper comprises a wiper blade having a rigid metal holder or shell 11, formed with a channel 12 receiving the bead 13 of a rubber wiper strip 14 in the manner described in my copending application Serial No. 93,009, filed May 13, 1949, for Windshield Wiper Blade; a clip, generally indicated at 15 in Fig. 1, comprising a housing 16 having base flanges or walls 17 provided with tongues 18 passing through openings in the top of the holder 11 and crimped thereunder to secure the clip rigidly to the wiper blades, spaced parallel sides 19, an end wall 20 and a top wall 21, as shown in Fig. 2; a wiper arm body generally indicated at 22 having an arm 23 provided with a laterally offset end portion 24 formed by the deflecting shoulders 25 and 26 and having a bearing socket 27 in the form of a transverse groove, near its tip; a shaft-like bearing 28 preferably consisting of a pivot pin fixed transversely of the clip between the sides 19, as by the shank of the rivet shown in Fig. 5; and a leaf spring 29 disposed in the clip housing 16 engaging the bottom end and top of the housing and having an end portion 30 resiliently engaging the outer surface of the bearing element 27 when the parts are pivotally connected as shown in Fig. 2, for releasably locking said parts in connected relation. The spring 29 is preferably shaped so that it may be removably inserted into the open end of the clip housing and retained therein by a depending flange 31 at the free end of the clip top 21, and by the shaft-like bearing element 28.

The opposite end of the wiper arm may be provided with any suitable coupling 32 for attaching the arm to the projecting shaft of a conventional windshield wiper motor (not shown). The wiper arm may be of any desired design, provided it is equipped with an end portion having the socket bearing 27, said end portion being preferably offset as above described so that the portion 24 may be disposed closely adjacent the holder 11 of the wiper blade, while the major portion of the arm 23 is spaced a substantial distance from the wiper blade. Various means may be provided for rigidly attaching the clip housing 16 to the holder 11.

The bearing elements 27 and 28 of the wiper arm 23 and the blade clip 16 afford a true pivotal bearing between the arm and the blade, and the spring 29 resiliently locks the bearing elements in operative relation, so that any movement between the pivotally connected parts, except pivotal movement, is eliminated, and so that any wear on the bearing surface is taken up by the pressure of the spring. Noise or chattering due to relative movement at the pivot is thus obviated. The spring also tends to restrain lateral tilting of the arm in the clip, and the possibility of such tilting is further avoided by the sliding engagement between the side edges of the offset end portion of the wiper arm and the sides 19 of the clip housing, the width of the offset arm end being substantially equal to or very slightly less than the distance between the clip sides 19. The improved connection thus affords a smoothly and silently acting separable connection between the wiper arm and the wiper blade.

The arm end is inserted into the clip 16, as indicated in Fig. 3, by manually pressing it endwise against the end portion 30 of the spring 29, so that the spring end is lifted to permit the socket bearing 27 to engage over the shaft or pin bearing 28 with a snap action. The interlock is accomplished smoothly and quickly, and no additional latching means are necessary to hold the parts in interlocking relation. The arm end is removed from the clip, as indicated in Fig. 4, by manually lifting the arm away from the wiper blade, to deflect the spring end 30 and permit the socket bearing 27 to be withdrawn over the top of the pin bearing 28.

Figure 6:
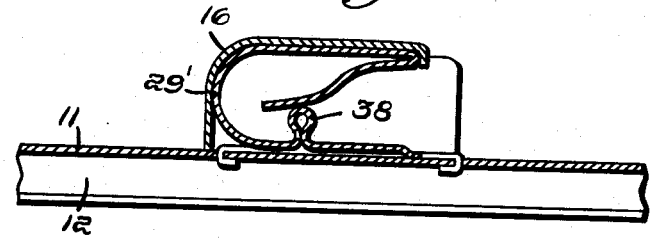
Fig. 6 is a view similar to Fig. 3, showing a modification of the bearing element in the blade clip, the wiper arm being omitted.

The shaft-like or pin-like, pivotal bearing carried by the clip 16 may take various forms, as desired. For example, in the modification shown in Fig. 6, the clip is provided with a bearing element 38 formed by bending the leaf spring 29' upon itself to provide a transverse loop adapted to be engaged by the socket bearing 27 of the arm end shown in the previous figures. The bearing 38 is considered to be a "pivotal" bearing element, within the meaning of that term as used herein and in the appended claims.

The locking spring of the improved connector may also take various forms, and may be applied to the arm end, instead of within the clip housing, if desired. As shown, for example, in Fig. 7 an offset arm end 24 of the wiper arm 23 above described has a leaf spring 39 applied to its underside and having a retaining portion 40 which engages the underside of the pivot bearing 41 which corresponds to the bearing 28 of the previous figures. The spring 39 may be attached to the wiper arm by the rivet 42, or by other fastening means. The top of the clip may be provided with a downwardly and rearwardly inclined flange 43 for guiding the arm end during its insertion into the clip; and the base of the clip housing may have a raised tongue 44, to serve as a stop engageable by the downwardly curved end 40 of the spring, to limit upward swinging movement of the arm relative to the blade.

Figure 7:
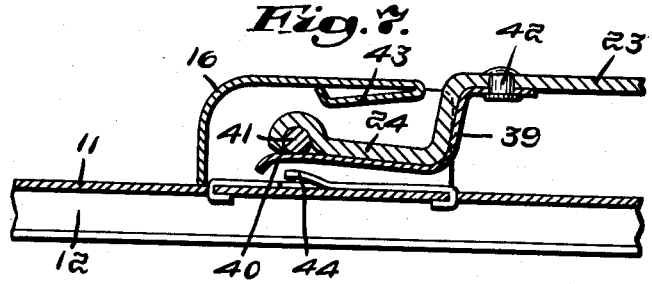
Fig. 7 is a view similar to Fig. 2 showing a modification of the connector elements.
Figure 8:
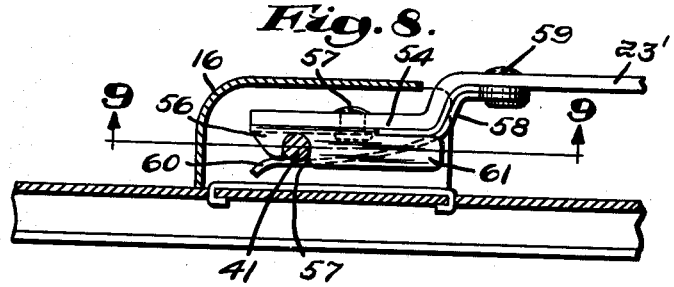
Fig. 8 is a view similar to Fig. 2 showing another modification of the connector elements.
Figure 9:
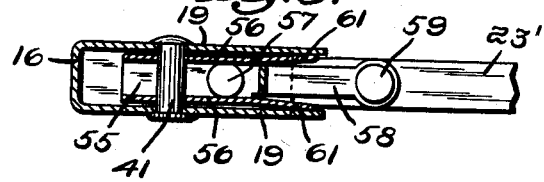
Fig. 9 is a longitudinal section on line 9—9 of Fig. 8.

In the further modification shown in Figs. 8 and 9, the wiper arm 23' is provided with an end portion 54 which is offset to a somewhat less extent than the arm end previously described. The arm end 54 does not have an integral socket bearing element, but is provided with an underlying channel member 55 having sides 56 formed with complemental notches 57 which constitute socket bearings engageable over the pin bearing 41. The channel member is secured beneath the arm end 54 by a rivet 57 or other fastening. A spring 58, somewhat similar to the spring 39 of Fig. 7 is attached to the underside of the arm 23 as by a rivet 59, and has a free end portion 60 engageable beneath the pin 41 when the parts are connected in substantially the same manner as the spring end 40 of Fig. 7. The sides 56 of the channel members are preferably provided with free, outwardly deflected tail portions 61, as best shown in Fig. 9. These tail portions bear resiliently against the inner surfaces of the clip sides 19, and thus further restrain any tendency of the arm end to swing laterally within the clip and thus to cause noise or chattering during the operation of the windshield wiper.

It will be observed that in each of the illustrated forms of the improved connector means, the spring which holds the separable parts in pviotally connected relation, urges the end of the wiper arm in the direction in which it is pressed by the conventional arm tension supplied by a tension spring (not shown) in the body of the wiper arm, to press the wiper blade against the windshield. The spring of applicant's connector resiliently presses the socket bearing elements of the arm ends of Figs. 7 and 8, as well as the arm end of Figs. 1 to 5, toward the wiper blade, so that the action of said spring does not counteract the action of the conventional tension spring in the wiper arm.

A windshield wiper equipped with the improved connector means herein described is simple and economical to manufacture, easy to assemble and disconnect, durable and efficient in use, and unusually silent in operation.

I claim:

1. In a windshield wiper, connector means comprising a clip mounted on the wiper blade and having spaced, substantially parallel sides, a pivotal bearing element fixed transversely between said sides, a wiper arm having an end insertable between said clip sides and provided with a socket-like bearing element pivotally and releasably engageable with said pivotal bearing element on the side thereof opposite said wiper blade, and a leaf spring associated with one of said bearing elements and resiliently engaging the other bearing element when said elements are pivotally connected, said spring acting to urge said arm end toward said blade and having an end portion engaging said pivotal bearing element on the side thereof away from said blade when the arm is removed from the clip.

2. In a windshield wiper, connector means comprising a clip mounted on the wiper blade and having spaced, substantially parallel sides, a shaft-like bearing element fixed transversely between said sides, a wiper arm having an end insertable between said clip sides and provided with a socket-like bearing element pivotally and releasably engageable with said shaft-like bearing element on the side thereof opposite said wiper blade, and a leaf spring associated with one of said bearing elements and resiliently engaging the other bearing element when said elements are pivotally connected, said spring acting to urge said arm toward said blade, said clip having top, bottom and end walls, and said spring being removably received in said clip and having portions engaging said walls and having an end portion engaging said shaft-like bearing element on the side thereof away from said blade when the arm end is removed from the clip.

3. In a windshield wiper, connector means comprising a clip mounted on the wiper blade and having spaced, substantially parallel sides, a pivotal bearing element fixed transversely between said sides, a wiper arm having an end insertable between said clip sides and provided with a socket-like bearing element pivotally and releasably engageable with said pivotal bearing element on the side thereof opposite said wiper blade, and a leaf spring associated with one of said bearing elements and resiliently engaging the other bearing element when said elements are pivotally connected, said spring acting to urge said arm end toward said blade and having an end portion engaging said pivotal bearing element on the side thereof away from said blade when the arm is removed from the clip, the said end of the wiper arm being offset in spaced, substantially parallel relation to said arm, thereby forming shoulders having edges slidably engageable with the sides of said clip when the arm end is inserted therein.

4. In a windshield wiper, connector means for separably attaching a wiper blade to a wiper arm, comprising a clip housing having a bottom fixed to the wiper blade and having spaced, substantially parallel sides, a top wall and an end wall, one end of the clip being open to receive the end portion of a wiper arm inserted therein, a bearing pin fixed transversely of the housing between its sides and above its bottom, a wiper arm having a laterally offset end portion provided with a transverse groove forming a socket bearing engageable with said pin, and a leaf spring contained in said clip housing and having an end portion pressing on said arm end on the side thereof opposite said groove, to hold the connected parts in pivotal engagement when the arm end is applied to said pin on the side thereof away from said blade, said spring end portion engaging said bearing pin when the arm is removed from the clip.

References Cited in the file of this patent

UNITED STATES PATENTS

| Number | Name | Date |
| --- | --- | --- |
| 2,260,905 | Horton | Oct. 28, 1941 |
| 2,285,618 | Scinta | June 9, 1942 |
| 2,417,575 | Thomson | Mar. 18, 1947 |
| 2,443,113 | Nesson | June 8, 1948 |
| 2,548,090 | Anderson | Apr. 10, 1951 |
| 2,576,077 | Ozarowski | Nov. 20, 1951 |